June 2, 1936. J. D. FERRY 2,042,655
MATERIAL TREATING AND HANDLING APPARATUS
Original Filed July 16, 1932 3 Sheets—Sheet 1
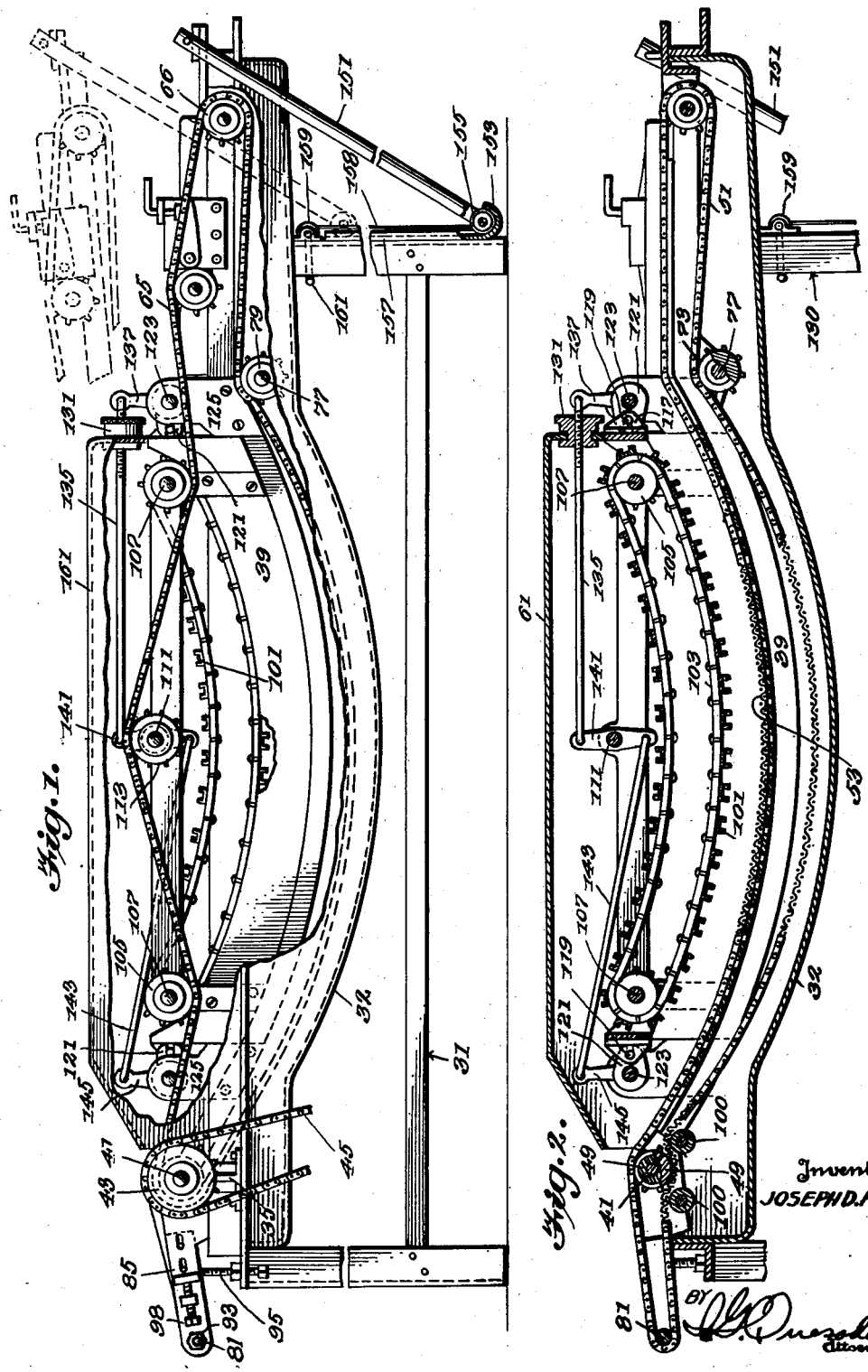
Inventor
JOSEPH D. FERRY

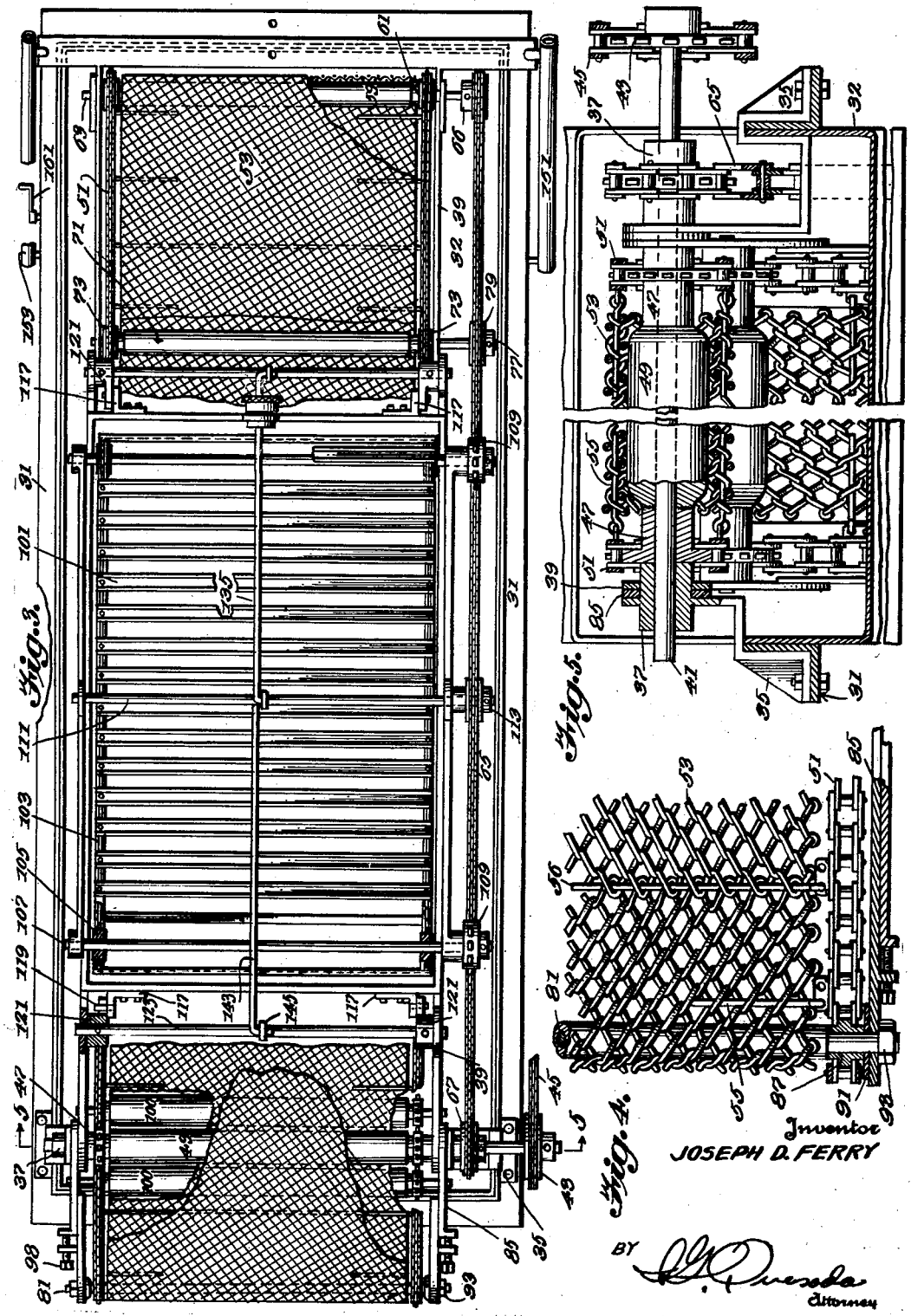

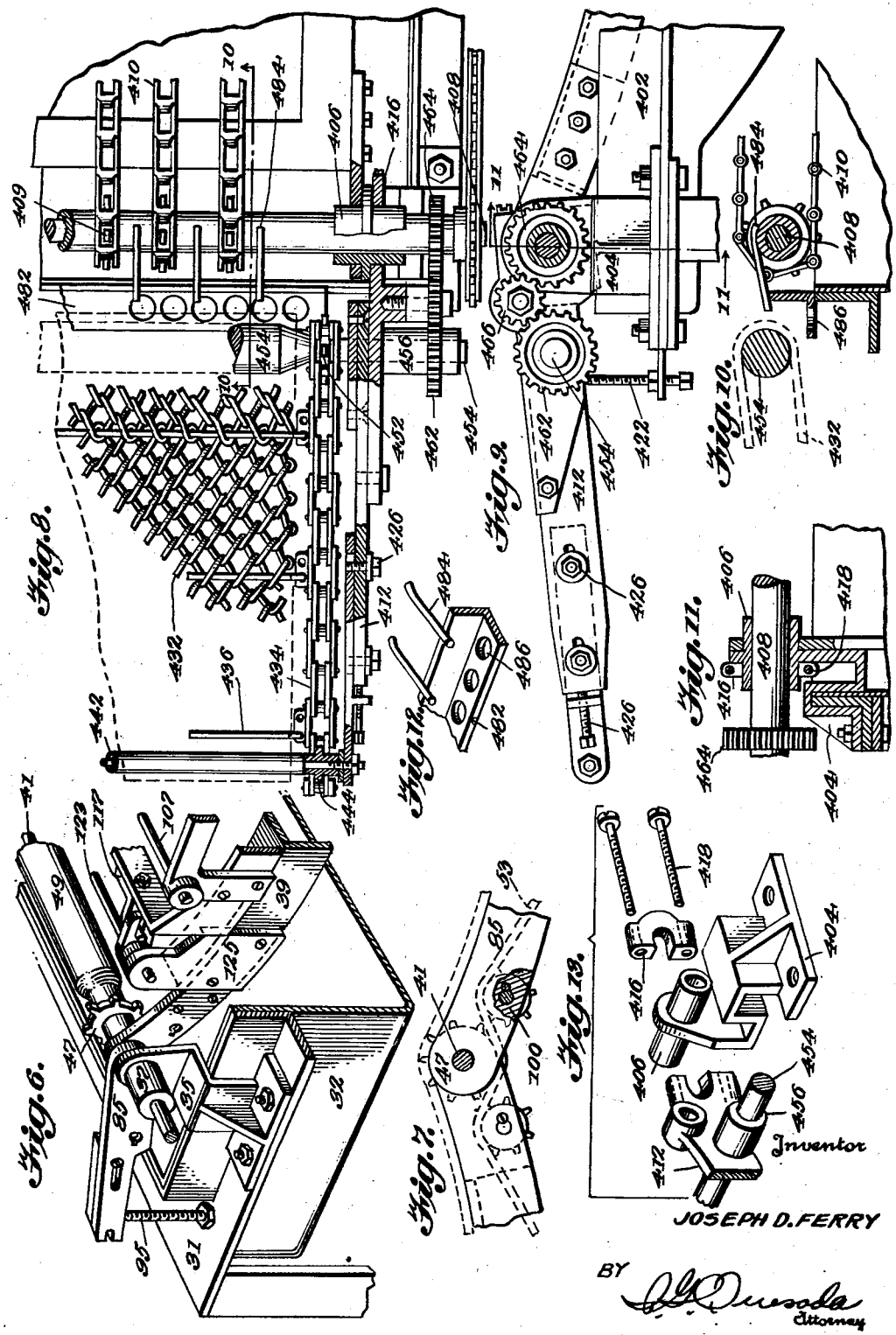

Patented June 2, 1936

2,042,655

UNITED STATES PATENT OFFICE 2,042,655

MATERIAL TREATING AND HANDLING APPARATUS

Joseph D. Ferry, Harrisburg, Pa.

Original application July 16, 1932, Serial No. 622,976. Divided and this application August 14, 1933, Serial No. 685,134

25 Claims. (Cl. 53—7)

This invention relates to an apparatus for the handling and treatment of foodstuffs such as pretzels and the application is a division of my co-pending application Serial Number 622,976; filed July 16, 1932.

It has been found that an endless woven wire belt or conveyor is admirably adapted for use in conducting pretzels through a cooking bath and the invention forming the subject of this application comprises, among other things, novel means by which such woven wire belt or conveyor is attached to cooperating driving elements in the form of endless chains or the like in a manner which positively avoids slipping of the belt with respect to the driving means therefor. Also, the particular means by which the woven wire belt is secured to the driving means such as the chains heretofore mentioned will be found to be easily applied and serviced; and at the same time such an arrangement allows the endless woven wire belt and the associated driving means to turn rather sharply and yet easily about the ends of the conveyor to allow of the advantageous transfer of the pretzel forms or the like from one conveyor to another.

In my prior Patent No. 1,760,979, there is a showing of a pretzel handling and preparing machine embodying upper and lower spaced conveyors between which the pretzel forms travel, the conveyors providing a means by which the pretzel forms are submerged for a predetermined period in a treatment solution and one phase of the invention forming the subject of this application has to do with the means by which the space between the upper and lower conveyors may be regulated throughout from a single point thereby simplifying this particular adjustment and rendering the same more accurate while at the same time there is provided a means by which the pretzel forms are subjected to uniform pressure by the conveyors while the pretzel forms are being conducted through the treatment solution of a liquid.

Another feature of the invention has to do with the novel hoisting mechanism by which the conveyors may be swung about a horizontal axis into an elevated position and raised from the treatment tank so that full access to the treatment tank for cleaning or other purposes is allowed while at the same time full access is allowed to the conveyors.

Other objects and advantages will be apparent during the course of the following description.

In the accompanying drawings forming a part of this application and in which like numerals are employed to designate like parts throughout the same, Figure 1 is a fragmentary side elevation of the machine, parts being broken away to illustrate the driving mechanism for the several conveyors, Figure 2 is a vertical longitudinal sectional view through the machine, the supporting means therefor being broken away, Figure 3 is a plan view of the machine, the hood being removed and parts, such for example, as the pretzel conveying means being broken away, Figure 4 is a fragmentary plan view illustrating a woven wire belt conveyor and the driving means therefor, Figure 5 is a fragmentary transverse sectional view taken on line 5—5 of Figure 3, Figure 6 is a fragmentary perspective of the outlet end portion of the apparatus, the view illustrating the means by which the several conveyors are mounted and the woven wire belt conveyor supporting means, Figure 7 is a fragmentary side elevation disclosing the outlet end portion of a material conducting conveyor, parts being shown in section, Figure 8 is a fragmentary plan view illustrating a slight modification of the invention, Figure 9 is a fragmentary side elevation of the mechanism shown in Figure 8, a portion of such mechanism being shown in transverse section, Figure 10 is a detail longitudinal sectional view taken on line 10—10 of Figure 8, Figure 11 is a vertical transverse sectional view taken on line 11—11 of Figure 9, Figure 12 is a fragmentary perspective illustrating a transfer member embodied in the form of invention shown in Figures 8, 9, 10 and 11, Figure 13 is a fragmentary group perspective illustrating the means by which an oven feeding conveyor is mounted.

In the drawings, wherein for the purpose of illustration are shown several preferred embodiments of the invention, the numeral 31 denotes a frame formed of a suitable material such for example, as angle iron and having a top supporting a tank 32. As usual, the tank 32 is adapted for the reception of a liquid solution through which pretzel forms or other food forms are directed as a preliminary to feeding the same to a baking oven as will be described. It is customary to provide suitable means by which a required liquid level is maintained in the tank 32, an example of such means being shown in my prior patent herein referred to.

It is also customary to maintain the liquid solution in the tank at a predetermined elevated temperature by any suitable means forming no special part of this invention and thus, no special illustration thereof will be found herein.

It is clearly shown in Figures 3 and 5 that the top horizontally disposed member of the frame is provided at a point adjacent the outlet end of the cooker and on opposite sides thereof with aligned brackets 35 having the upper portions thereof provided with horizontally disposed aligned bearings 37.

By reference to Figure 3 it will be seen that the terminal portions of the sides of a conveyor frame 39 are horizontally hinged or pivoted to the inner portions of the bearings 37 so that the conveyor frame 39 and an associated conveyor may be positioned in the tank as shown in full lines in Figure 1 or raised to the dotted line position also shown in this figure. In other words, the sides of the frame 39 are provided with transverse aligned openings receiving the inner portions of the bearings 37 so that the conveyor frame 39 is horizontally hinged to the brackets 35.

By special reference to Figure 5 it will be observed that the bearings 37 are bored longitudinally for the reception of a main drive shaft 41 to which there is secured a motion transmitting element such as a drive wheel 43. This figure also shows that a drive chain 45 is trained about the sprocket wheel 43 and, of course, has connection with a suitable source of power forming no part of this invention.

It is further shown in Figure 5 that the drive shaft or member 41 has mounted thereon a pair of sprocket wheels 47 and these sprocket wheels are welded or otherwise secured to the ends of a guide roller 49 also mounted upon the drive shaft 41.

The sprocket wheels 47 are shown in Figure 5 to have driving connection with sprocket chains 51. The sprocket chains 51 are located at opposite edges of a conveyor body 53, which conveyor body is in the form of a longitudinally and transversely flexible woven wire body composed of a series of transversely extending more or less helical interlocking lengths of wire.

The conveyor body 53 is secured flexibly and yet securely to the side chains 51 through the medium of a plurality of spaced attaching stems 55.

In this connection attention is invited to Figure 4, in which it is illustrated that the chains 51 are provided at uniformly spaced points thereof and on the inner links thereof with inwardly directed apertured ears to which the looped outer terminal portions of the stems 55 are loosely swivelled. Each ear is shown to be provided with two apertures through which the loops of the stems are selectively extended, allowing the stems 55 to be secured to the ears at the most advantageous points for the even and smooth mounting of the conveyor body. This threading of the stems 55 through the aligned convolutions of the transversely extending helically wound wires of the conveyor body 53 produces a positive driving connection between the conveyor body and the oppositely located drive chains therefor.

It has been found in actual practice that the particular connection between the conveyor body and the side chains thereof allows the conveyor to make the required sharp return bend at the outlet end of the cooker so that the smooth discharge of pretzel forms from the cooker is allowed and this arrangement also provides a simple and expeditious connection between the conveyor body and the side chains.

As shown in Figure 4 an important part of the invention resides in the fact that the conveyor body 53 is formed of alternating sections of right and left hand weave with the meeting ends of the sections having overlapped convolutions through which connecting wires 56 are threaded. The ends of these wires may be joined to the links of the side chains as are the attaching stems 55.

As shown in Figure 3, the receiving end portion of the conveyor body 53 is trained about a guide roller 59 while the sprocket chains 51 of the conveyor body 53 are trained about sprocket wheels 61 secured in any suitable manner, as by welding, to the ends of the roller 59. The roller 59 and the sprocket wheels 61 of which there are two, are keyed or otherwise secured to a shaft 63 the latter being extended through the sides of the conveyor frame 39 and provided at one end portion with a sprocket wheel 65.

In carrying out the invention, the shaft 63 has connection with the main drive shaft 41 through the intervention of an endless chain 65 and sprocket wheels 66 and 67. In this manner, the conveyor is driven from opposite end portions thereof.

It is shown in Figures 1, 2 and 3, that the lower flight of the conveyor body 53 is trained over a guide roller 71 so that the conveyor body is held above and is spaced from contact with the bottom of the horizontally extending inlet portion of the tank 32.

The ends of the roller 71 are secured by welding or other suitable means to sprocket wheels 73 over which the sprocket chains 51 are trained. Both the roller 71 and the sprocket wheels 73 are mounted upon a shaft 77, upon one terminal of which there is an idler sprocket 79. Over the idler 79, the lower flight of the endless chain 65 is trained so as to prevent the same from dragging along the bottom of the tank.

In Figures 2 and 4 it is illustrated that the outlet end portion of the conveyor body 53 is extended beyond and downward from the guide roller 49 and is trained about a small diameter transversely extending cylindrical bar 81. The terminal portions of the bar 81 are extended through and are rigidly secured to the outer portions of sectional arms 85.

With particular reference to Figure 4 it will be seen that the terminal portions of the transversely extending bar 81 are reduced to define shoulders against which the inner ends of collars 87 bear. The collars 87 are formed between the ends thereof with external annular ribs positioned between the longitudinally extending links of the chains 51 so as to constitute guides holding these chains against lateral movement.

The collars 87 are confined closely between washers 91 and the shoulder portions of the bar 81, the washers being confined between the outer ends of the collars and the inner surfaces of the arms 85. It will be apparent that the fastening devices 93 secured to the terminal portions of the bar 81 form a simple means by which the washers 91 and the collars 87 are secured rigidly in place.

The rollers of the chains 51 ride about the ribs of the collars 87 with the links of the chains spaced from contact with the peripheries of the collars so that excessive wear of these parts is avoided. Incidentally, the collars 87 and the washers 91 are preferably of a tool steel hardened to resist wear.

The employment of the small diameter collars 87, as shown, is instrumental in providing for a sharp and yet easy return bend of the conveyor at the discharge terminal of the conveyor.

Referring now to Figures 1, 3 and 4, attention is invited to the fact that the arms 85 of the outlet portions of the main conveyor are horizontally hinged or are swivelled to the bearings 37 immediately outward of the sides of the frame 39 and are adjustable about the axis of the shaft 41. By particular reference to Figure 1 it will be seen that the arms 85 are engaged at the lower edges thereof by set screws 95 threaded through the top of the frame and having lock nuts so as to hold the same in place.

It is believed to be clear that the purpose of the set screws 95 is to maintain the outlet portion of the main conveyor at the desired angle for feeding pretzel forms or the like to the oven, not shown.

The arms 85 are made up of overlapping sections adjustably connected, providing a simple means by which the arms may be extended with the aid of set screws 98, the set screws being extended through ears carried by the outer sections of the arms and engaging ears formed at the ends of the inner sections. This simple arrangement provides a means by which the required tension may be maintained on the conveyor body 53.

Attention is invited to Figures 2 and 7 in which it is shown that the conveyor body 53 has the lower flight thereof trained over a pair of guide rollers 100 located below and at opposite sides of the guide roller 49. The ends of the rollers 100 have sprocket wheels engaged with the adjacent portions of the lower flights of the conveyor chains 51 so as to hold such lower flights of the chains in constant engagement with the sprocket wheels 47. In this fashion, the conveyor body 53 is drawn tightly about the cross bar 81 to avoid the possibility of slack at this point. That is to say, that part of the endless belt forming the discharge portion of the conveyor is tensioned independently of the remaining part of the conveyor. This is due to the drive of the conveyor through the upper and lower flights thereof and to the presence of the longitudinally adjustable arms 85. Further, the rollers 100 and the associated sprocket wheels serve to support the lower flight of the conveyor above and in spaced relation to the bottom of the tank.

It is clearly shown in Figure 2 that a second conveyor is located above the conveyor previously described and embodies an endless series of transversely extending channel bars 101 having the flanges thereof presented outward. The channel bars are secured at the end portions thereof to sprocket chains 103. The sprocket chains 103 are in turn, trained about sprocket wheels 105 keyed or otherwise secured to transversely extending shafts 107.

It is illustrated in Figure 3 that the shafts 107 carry sprocket wheels 109 engaged by the drive chain 65 so that the upper conveyor is driven from opposite ends thereof. Movement of the upper conveyor in the proper direction is brought about by engaging the under sides of the sprocket wheels 109 with the upper flights of the chain 65. The frame of the upper conveyor is provided at a point between the ends thereof with a transversely extending shaft 111 having one end portion thereof provided with an idler sprocket wheel 113 over which the drive chain 65 is trained.

The upper conveyor is adjustable vertically with respect to the lower conveyor. In explanation of this, attention is invited to Figures 1, 2 and 3 in which it is illustrated that the ends of the frame of the upper conveyor are provided adjacent the corners of the frame with ears 117 having laterally projecting pins 119 located in the slotted terminal portions of cranks 121. By reference to Figure 6 it will be seen that the cranks 121 are pinned or otherwise rigidly secured to transversely extending crank shafts 123. Such crank shafts 123 are rotatably carried by brackets 125 secured to the side members of the frame 39.

Clearly, rocking of the shafts 123 will bring about the actuation of the cranks 121 thereof and this, in turn, brings about the raising or lowering of the upper frame depending of course, upon the direction in which the shafts are turned.

Simultaneous and coextensive rocking of the shafts 123 is brought about through the turning of a feed nut 131 shown in Figures 1 and 2 to be rotatably attached to one end of the super frame and threaded on a link 135. The outer end of the link 135 is pivoted to a crank arm 137 of one of the shafts 123 and the inner end of the link is pivoted to a motion transmitting lever 141 mounted on the shaft 111. The motion transmitting lever 141 is shown to have connection with a longitudinally movable link 143 connected at the outer end thereof to a crank 145 of the second crank shaft 123. Thus, turning of the feed nut 131 will move the link 135 endwise to rock the shafts 123 simultaneously and co-extensively so that the upper conveyor is adjusted uniformly throughout with respect to the lower conveyor.

The adjustability of the upper conveyor with respect to the lower conveyor provides a means by which the space between such conveyors may be regulated for maintaining the desired pressure on the pretzels or the like.

By way of a brief review of the adjustability of the upper conveyor with respect to the lower conveyor, it is pointed out that such conveyors have frames, and that the lower frame 39 carries brackets 125 having operative relation with the motion transmitting elements or ears 117 through the intervention of the cross shaft 123 which forms a part of an adjusting mechanism. The adjusting mechanism for the upper conveyor thus acts on both ends of the upper conveyor for imparting predetermined simultaneous proportional adjustment to the end portion of the upper conveyor with respect to the adjacent portions of the lower conveyor, so as to maintain the required pressure on the food forms being carried by the lower conveyor.

In this connection, it is noted that the pressure relation between the pretzel forms and the opposed flights of the upper and lower conveyors serves a dual purpose; first, for the positive submersion of the pretzel forms while being passed through the treatment solution and second, for the establishment of definite traction between the pretzel forms and the upper flight of the lower conveyor to the end that the pretzel forms are prevented from partaking of retrograde movement upon reaching the ascending portion of the lower conveyor.

A hood 161 located above the upper conveyor serves to collect the steam generated incident to the heating of the liquid solution in the tank. The outlet end portion of the hood is inclined downward in the direction of the ascending portion of the main conveyor to direct the discharging steam into intimate contact with the pretzel forms prior to their removal from the liquid treating solution and it has been found that by thus directing the discharging steam into contact with the pretzel forms, the pretzel forms are better prepared for the application and adhesion of salt thereto and at the same time the appearance and quality of the pretzels is improved.

In addition, the downwardly inclined outlet end portion of the hood directs the discharging steam into intimate contact with the conveyor and associated parts so as to dissolve accumulated matter thereon and thus render the cooker self-cleansing to a high degree. At this point, attention might be invited to Figure 2 in which it is shown that the tank 32 extends below the roller 49 and associated parts, such as the adjacent rollers 100, so as to receive matter dropped from these parts.

In the opening paragraphs of this specification it was pointed out that the conveyors may be raised with the aid of a hoisting mechanism and in this connection, attention is directed to Figures 1 and 3 in which it is shown that the hoisting mechanism embodies a pair of links 151 horizontally hinged at the upper portions thereof to the otherwise free end of the frame 39. The lower ends of the links 151 have connection with a transversely extending shaft 153 upon which there are mounted radially beveled rollers 155. These rollers 155 are confined between the side flanges of channeled guides 157 and the lower portions of these guides are curved outward and upward so as to define stop elements by which the lower portions of the links 151 are held against outward swinging movement.

The cross shaft 153 has connection at one end with one or more hoisting cables 158, the upper portions of which are trained about wheels 159. It is shown in Figure 3 that a hand operated crank 161 has connection with the wheels 159 and provides a means by which the cables 158 may be wound upon the wheels to bring about upward movement of the links 151 so as to raise the conveyors to the dotted line positions suggested in Figure 1. The parts 158, 159 and 161 constitute a hoisting mechanism. After the conveyors have been raised to the dotted line position shown in Figure 1, a prop or other means may be employed to hold the parts in this position to afford full and unobstructed access to the tank for cleaning or other purposes.

From an inspection of Figures 1, 2, 3, and 6, it will be seen that the mechanism herein shown, embodies an endless conveyor of flexible material mounted upon separate frames 39 and 85, dividing the endless conveyor into sections. These separate frames are pivotally supported by the mountings or brackets 35 which leads to the statement that such frames are mounted for movement about a common axis. The frame 39 and that part of the conveyor carried thereby may be moved about this axis by the hoisting mechanism made up of the members 151 and associated parts, while the frame 85 may be moved about the said common axis by the set screws 95 or the equivalent thereof, from which it will be seen that the several sections of the conveyor are movable individually and independently about a common axis.

The shafts or cross members 59 and 81 at the extremities of the conveyor constitute supports for the endless conveyor belt and cause the belt to make the required bends.

In the form of invention shown in Figures 8 to 13 inclusive, the frame 402 of the apparatus is provided with aligned brackets 404 corresponding to the brackets 35 and having bearings 406 through which a driving shaft 408 is extended. The drive shaft 408 is provided with a plurality of spaced parallel sprocket wheels 409 about which are trained the spaced parallel conveyor chains 410, the conveyor chains 410 being arranged rather close together to form a bed or conveyor upon which the pretzels are mounted for passage through the liquid treatment solution.

A discharge conveyor is arranged at the outlet end of the apparatus as shown in Figures 8 and 9, and embodies a pair of spaced parallel side arms 412 having sectional bearings 416 secured about the bearings 406 with the aid of fastening devices 418. This connection of the arms 412 with the bearings 406 allows the arms to be swung about the axis of the shaft 408 to adapt the discharge conveyor to a salting mechanism or to the movable hearth of an oven.

As shown in Figure 9 to lower edges of the arms 412 are engaged by set screws 422 carried by the frame of the machine and forming a means by which the outlet conveyor may be adjusted. The side arms 412 embody overlapped sections adjustably connected by fastening devices 426 providing a means by which the effective length of the conveyor may be varied so as to maintain the desired or required tension on the endless woven wire belt 432.

As shown in Figure 8, the edges of the woven wire belt or conveyor body 432 are connected to the driving chains 434 through the aid of steel wire attaching stems 436, the outer portions of which are looped through the inwardly directed apertured ears secured to spaced links of the roller chains 434 so that a positive driving connection is established between the driving chains 434 and the associated conveyor belt. The outer portions of the arms 412 have connection with a small diameter transversely extending bar 442, the end portions of which carry hardened tool steel collars 444 corresponding to the collars 87 and providing a means by which the chains may turn sharply at the discharge end of the conveyor.

The sprocket chains 434 are also trained about sprocket wheels 452 secured to a shaft 454. The shaft 454 is shown in Figure 8 to extend through the bosses 456 carried by the inner portions of the arms 412 and this shaft is provided with spur gears 462 having operative connection with the gears 464 through the intervention of spur gears 466 so that the turning of the shaft upon which the gears 464 are mounted will result in corresponding rotation of the shaft 454. It is shown in Fig. 10 that the shaft 454 has the receiving end portion of the conveyor 432 trained about the same.

The angle bar 482 shown in Figures 8 and 12 has one side thereof extended vertically and provided with a plurality of longitudinally curved fingers 484 extending between the conveyor chains 410 and providing a means by which the pretzel forms are positively detached from the conveyor chains at the end of travel thereon. It is clearly shown in Figure 12 that the pick-up fingers are secured between the ends thereof to the upper edges of the angle bar 482 and provide a convenient and reliable means by which the pretzel forms are conducted from the conveyor chains 410 to the conveyor belt 432 and the lower horizontal flange of the angle bar is formed with a series of openings 486 for the passage of salt and other matter that might otherwise congest at this point. The ends of the angle bar 482 are secured by welding or otherwise to the arms 412. That is to say, the modified form of invention shown in Figures 8 to 13 inclusive, contemplates a pair of cooperating conveyors arranged end-to-end, with one of the conveyors embodying a plurality of spaced parallel chains 410 in feeding relation to the transfer mechanism 482, which transfer mechanism embodies a plurality of spaced fingers 484, extending between the chains to facilitate the movement of the food forms onto the woven wire belt 432.

Having thus described the invention what is claimed is:

1. In an apparatus of the character specified, a woven wire belt having a plurality of interlocked convolutions, stems threaded through said convolutions, and driving chains having laterally projecting ears, said stems having universal pivotal connection with said ears whereby the drive of the belt is through the ears of the chains and through the stems.

2. In a mechanism of the character specified, a conveyor formed of lengths of wire having loosely interlocked convolutions, a driving chain for the conveyor and having links, and stems threaded through said convolutions and having universal pivotal connection with said chain.

3. In a structure of the character specified, a bar, a conveyor belt trained about the bar, collars on the bar and having annular ribs, and roller chains having transverse rollers engaging said ribs and having links spaced from said collars by the ribs.

4. In a structure of the character specified, a bar, a conveyor belt trained about the bar, collars on the bar and having annular ribs, roller chains having transverse rollers engaging said ribs and having links spaced from said collars by the ribs, and means connecting the chains and the belt.

5. In a structure of the class described, a frame, brackets carried by the frame and having bearings, a conveyor frame horizontally hinged to said bearings, arms horizontally hinged to said bearings and extending beyond said conveyor frame, a cross bar secured to the outer portions of said arms, a shaft extending through said bearings, a guide roller secured to said shaft and located between the bearings, and a conveyor belt trained about said guide roller and said cross bar.

6. In a structure of the class described, upper and lower conveyors having frames, brackets carried by the frame of the lower conveyor, crank shafts carried by said brackets and having radial cranks, pins carried by the frame of the upper conveyor and engaged by said cranks, and means to turn said crank shaft simultaneously and coextensively.

7. In a structure of the class described, upper and lower conveyors having frames, brackets carried by the frame of the lower conveyor, crank shafts carried by said brackets and having cranks, pins carried by the frame of the upper conveyor and engaged by said cranks, and means to turn said crank shaft simultaneous and coextensively and embodying a pair of cooperating links and a feed screw mounted on one of the links.

8. In an apparatus of the character specified, a tank, a conveyor horizontally hinged above the tank and embodying a plurality of transversely extending rolls, said tank being extended beneath the transversely extending rolls to receive matter therefrom.

9. In a structure of the class described, a frame, a conveyor horizontally hinged to the frame, links movably pivoted to one end of the frame and having the lower portions thereof provided with rollers, a transverse shaft connected to said rollers, a hoisting mechanism connected to said transverse shaft, and a guiding means associated with said rollers and having stops limiting outward movement of said rollers.

10. In a mechanism of the character specified, a pair of cooperating conveyors, arranged end to end, one of said conveyors embodying a plurality of spaced parallel chains, and a transfer mechanism between the conveyors and embodying a plurality of spaced fingers extending between the chains, said transfer mechanism embodying an angle bar having horizontal portions provided with openings for the descent of material.

11. In a mechanism of the character specified, a pair of cooperating conveyors arranged end to end, one of said conveyors embodying a plurality of spaced parallel chains, and a transfer mechanism between the conveyors and embodying a plurality of spaced fingers extending between the chains, said transfer mechanism embodying an angle bar having horizontal portions provided with openings for the descent of material, and means establishing a driving connection between the first and second named conveyors.

12. In a mechanism of the class described, a continuous conveyor having upper and lower flights and a drive chain also having upper and lower flights, a driving roller between the ends of the conveyor and between the upper and lower flights thereof and provided with a sprocket wheel meshing with the upper flight of said chain, and means holding the lower flight of the chain in mesh with said sprocket wheel whereby to draw the upper and lower flights of the conveyor tightly about one end of the conveyor.

13. In a mechanism of the class described, an endless conveyor having upper and lower flights and a drive chain also having upper and lower flights, a drive roller between the flights of the conveyor and having a sprocket engaged with the upper flight of the chain, a tensioning device for tightening that portion of the conveyor between one end thereof and said sprocket, and means causing positive engagement between said sprocket and the lower flight of the chain to drive the chain and the conveyor through the lower flight thereof.

14. In a mechanism for manufacturing food stuffs, a woven wire endless belt having upper and lower flights and connecting bends, said belt comprising overlapping convolutions, stems threaded through said convolutions to join the same and having eyes, and drive chains having laterally projecting ears formed with groups of openings through which the eyes of said stems are selectively swivelled so that the belt may move easily through said bends.

15. In a mechanism for manufacturing food stuffs, a woven wire endless belt having upper and lower flights and connecting bends, said belt comprising overlapping convolutions, stems threaded through said convolutions to join the same, and drive chains having laterally projecting ears formed with groups of openings through which the terminal portions of said stems are selectively swivelled so that the belt may move easily through said bends.

16. In a machine for manufacturing food stuffs, a frame, brackets carried by the frame and having bearings, a conveyor frame hinged to said bearings, arms hinged to said bearings and extending beyond said conveyor frame, separate supports carried by said arms and by said conveyor frame, and a single belt trained about said supports.

17. In a machine for manufacturing food stuffs, a frame, brackets carried by the frame and having bearings, a conveyor frame hinged to said bearings, arms hinged to said bearings and extending beyond said conveyor frame, separate supports carried by said arms and by said conveyor frame, a single belt trained about said supports, and adjusting devices for varying the height of said arms and the portion of the conveyor belt immediately adjacent thereto.

18. In a machine for manufacturing food stuffs, a frame, brackets carried by the frame and having bearings, a conveyor frame hinged to said bearings, arms hinged to said bearings and extending beyond said conveyor frame, separate supports carried by said arms and by said conveyor frame, and a single belt trained about said supports, said arms being longitudinally extensible and adjustable to vary the tension on said conveyor belt.

19. In a machine for manufacturing food stuffs, an endless conveyor of flexible material, separate frames supporting the endless conveyor and dividing the endless conveyor into meeting sections, a mounting supporting the separate frames for movement about a common axis, and means for individually and independently moving the sections of the conveyor about said common axis.

20. In a machine for manufacturing food stuffs, an endless conveyor of flexible material, separate frames supporting the endless conveyor and dividing the endless conveyor into meeting sections, said sections being arranged end-to-end, a mounting supporting the separate frames for movement about a common axis, and means for moving one section of the conveyor about said common axis independently of the other section of the conveyor.

21. In a structure for manufacturing food stuffs, upper and lower associated conveyors having frames, brackets carried by the frame of one of the conveyors, and motion transmitting elements carried by the end portions of the other conveyor and having operative relation to the said brackets, and an adjusting mechanism associated with said brackets and said motion transmitting elements and having means for imparting predetermined simultaneous proportional adjustment to the end portions of one conveyor with respect to the adjacent portions of the other conveyor.

22. In a structure for manufacturing food stuffs, upper and lower associated conveyors having frames, motion transmitting elements located at the end portions of one of the conveyors, and an adjusting mechanism associated with said motion transmitting elements and having means for imparting predetermined proportional simultaneous adjustment to the end portions of one conveyor with respect to the adjacent portions of the other conveyor.

23. In a machine for manufacturing food stuffs, a cross bar, an endless conveyor belt trained about said bar, collars fixed on said bar and having continuous and unbroken ribs between and spaced from the ends of the collars, and roller chains having transverse rollers engaging said ribs and having links spaced from said collars by the ribs.

24. In a machine for manufacturing food stuffs, a bar, a conveyor belt trained about the bar, collars rigidly secured on the bar and having peripheral unbroken ribs, and roller chains having transverse rollers progressively riding about said ribs and having links spaced from the collars by the ribs.

25. In a mechanism for handling food stuffs, an endless conveyor having upper and lower flights and a discharge portion provided with a discharge terminal, said conveyor also embodying a drive chain having upper and lower flights, a drive member having a sprocket engaged with the upper flight of the chain adjacent to said discharge portion of the conveyor and at a point removed from the discharge terminal of such discharge portion, and a tensioning device for tightening those portions of the upper and lower flights of the conveyor located between said discharge terminal and said sprocket independently of the remaining portion of the conveyor.

JOSEPH D. FERRY.